United States Patent [19]

Moore et al.

[11] Patent Number: 4,486,676
[45] Date of Patent: Dec. 4, 1984

[54] SUPERCONDUCTING ROTOR WITH END TURN REGION INTERMITTENT SUPPORT AND COOLING ASSEMBLY

[75] Inventors: William G. Moore, Monroeville; Phillip W. Eckels, Penn Hills Township, Allegheny County; Michael R. Jugan, Duquesne, all of Pa.

[73] Assignee: Electric Power Research Institute, Inc., Palo Alto, Calif.

[21] Appl. No.: 571,260

[22] Filed: Jan. 16, 1984

[51] Int. Cl.³ .................. H02K 3/48; H02K 9/197
[52] U.S. Cl. ................................... 310/52; 62/505; 310/64; 310/214; 310/270
[58] Field of Search ............... 62/55, 505, 514 R; 310/52, 54, 55, 58, 60 A, 61, 64, 65, 214, 215, 260, 270

[56] References Cited

U.S. PATENT DOCUMENTS 4,282,450 8/1981 Eckels ........................... 310/52
4,356,700 11/1982 Eckels et al. .................... 62/55
4,368,399 1/1983 Ying et al. ...................... 310/214
4,442,369 4/1984 Okamoto et al. ................ 310/270

Primary Examiner—J. D. Miller
Assistant Examiner—D. L. Rebsch
Attorney, Agent, or Firm—G. H. Telfer

[57] ABSTRACT

The end turn region of a superconducting rotor is provided with end region support blocks that together provide channels for coil location. Within the support block channels there are intermittent supports in the form of insulating spacers extending radially both to the front and to the rear of the coil and also bottom spacers, with sheets of side insulation between the front and rear spacers and the adjacent support blocks. The intermittent supports provide access of coolant to the superconductor. They may also be formed in a manner to tilt the end region toward the pole piece for better mechanical support. A top insulating spacer is provided with cooling channels and is utilized with banding to provide secure compressive support for the end windings. Apertures in the support blocks and grooves in the spacers provide collant circulation.

3 Claims, 8 Drawing Figures

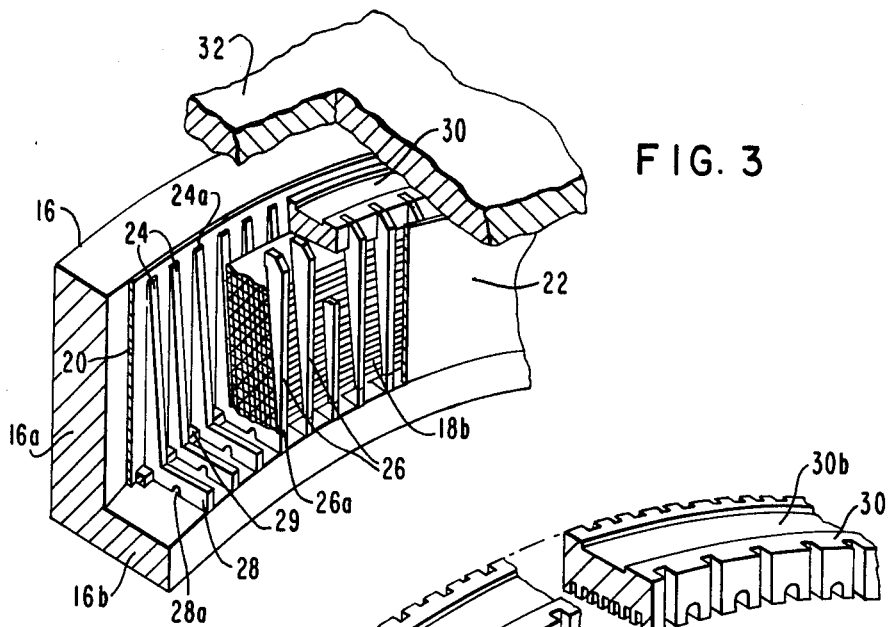
FIG. 3
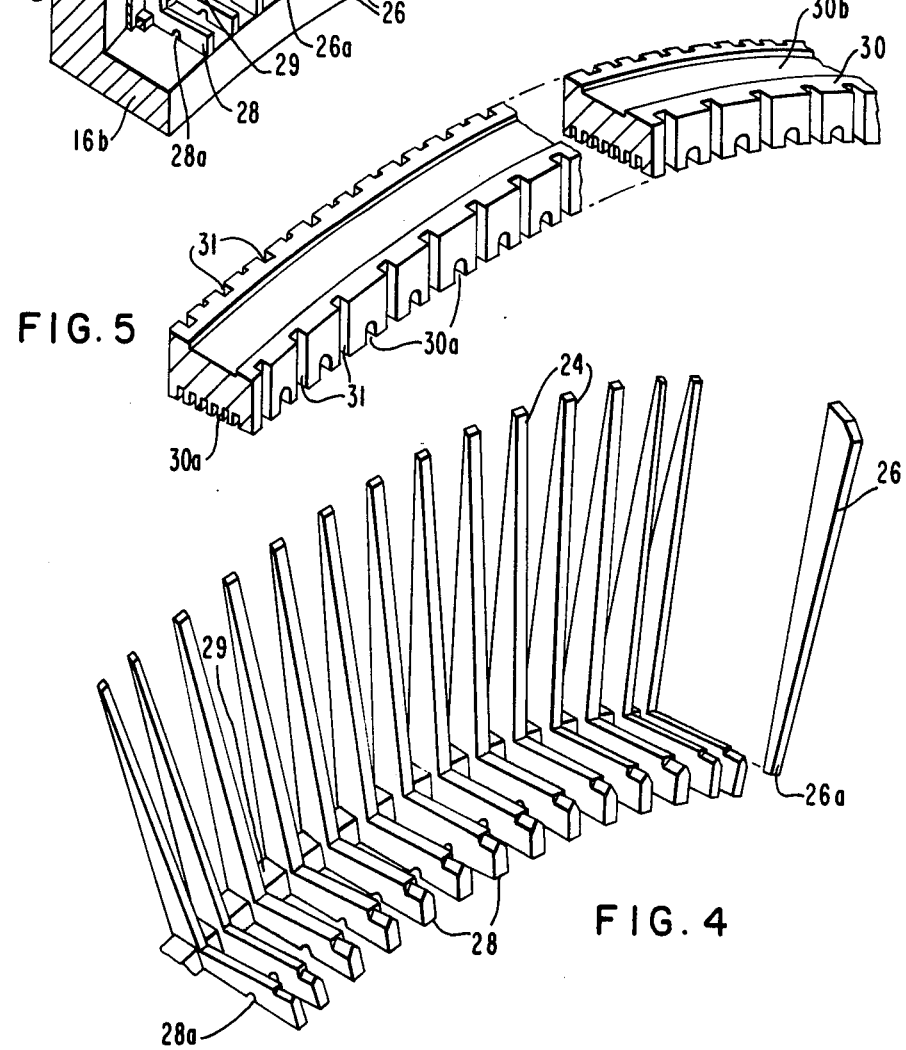
FIG. 5
FIG. 4

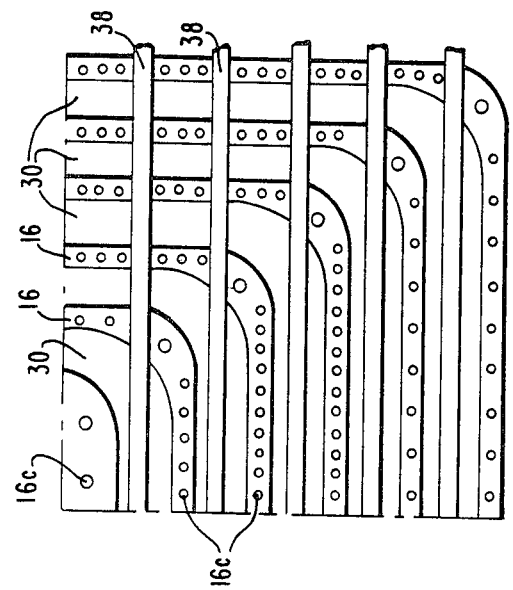
FIG. 7
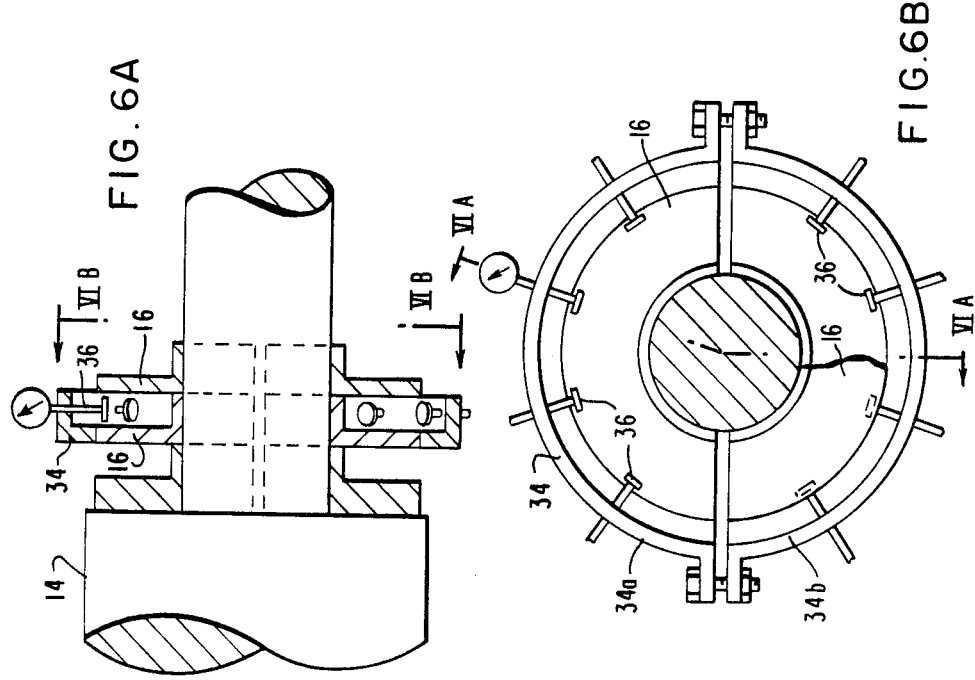
FIG. 6A
FIG. 6B

SUPERCONDUCTING ROTOR WITH END TURN REGION INTERMITTENT SUPPORT AND COOLING ASSEMBLY

BACKGROUND AND SUMMARY OF THE INVENTION

This invention relates to dynamoelectric machines with a superconducting rotor winding and particularly to the support, insulation, and cooling of the end turn region of the rotor winding.

Ying et al. U.S. Pat. No. 4,368,399, Jan. 11, 1983, which is herein incorporated by reference, discloses a superconducting rotor end turn support arrangement upon which the present invention improves.

The end turn windings of a superconducting generator rotor require methods of support, cooling, insulation and assembly much different than those of a conventional, i.e., nonsuperconducting rotor. One of the major reasons is the magnitude and direction of the forces on the winding. In addition to the normal radial load on a coil due to centrifugal effects, much larger magnetic forces are produced in the winding due to the increased number of ampere turns in the field winding of a superconducting rotor. These magnetic loads, which can be on the order of about 10,000 pounds per inch, have two components. One component is radially outward from the centerline of the rotor and the other component is normal to the radial component. The normal component is everywhere directed away from the pole, that is, axially outward from the U-shaped end turn. The radial electromagnetic loading adds to the radial loading due to rotation. These additional electromagnetic forces, not significant in a conventionally cooled rotor, require high strength forging material to adequately constrain the superconducting winding.

The superconducting winding is mechanically constrained in the rotor body in slots formed by rotor teeth and closed by wedges, similar to that portion of a conventionally cooled rotor. The additional requirements for cooling a superconducting winding in a rotor can be provided for by means such as that disclosed in Eckels U.S. Pat. No. 4,282,450, Aug. 4, 1981. Constraining the superconducting end winding requires still further improvement over a conventionally cooled rotor. The conventional method of brazing and blocking the end turns is not adequate to support the superconducting winding against the additional electromagnetic loads. There have thus been provided, as disclosed in the above-mentioned Ying et al. patent, extensions of the teeth, called end region support blocks, which support the winding in the end turn region. These end region support blocks are made of the same high strength rotor forging material as the rotor body in which the slots are located. Even with these high strength support blocks, however, small displacements between adjacent conductors due to elastic deformation of the coil will occur. These small displacements, which may be only of about 0.001 to 0.01 inch (about 0.025 to 0.25 mm.) between adjacent conductors can generate heat due to the rubbing that occurs. If this heat goes into the winding it can cause the superconducting winding to rise above its transition temperature and to be quenched, i.e., the winding may lose its superconducting properties.

As a consequence of the foregoing considerations, the cooling scheme and the structural support scheme for the end winding are essentially related. Coolant must be provided not only to cool the winding below its transition temperature when stable but also to keep it at this temperature by removing any heat generated by any motion of the superconductors in operation. The aim is therefore to provide a mechanically secure end winding assembly but still one in which the coolant, normally liquid helium, is present over substantial major portions of the superconductor surfaces with provision for the helium to flow freely through cooling channels in a circulation path. As superconducting rotors are intended to operate, a reserve of liquid helium is stored in the bore of the inner rotor. The helium is to be moved by rotational forces from the bore through holes in the pole head and out into the winding cooling channels providing a cold helium reserve for cooling within the confines of the end region support block. A natural convection system operating in a "g" field insures proper cooling of the winding. When any local heat generation occurs, the warmer helium in the hot spot area is recirculated to the cold storage volume at the sides of the coil. Due to the support and constraint requirements of the superconducting field winding, it is not possible to have the end turns totally floating in liquid helium with direct contact of the coolant with the entirety of the superconducting surface.

The structure as disclosed in the Ying et al patent helps to hold the end winding in place within the end region support blocks by a set of insulating spacers, one on each side of a coil. The insulating spacers as there disclosed would, however, limit coolant access to the exterior of the coil to an undesirable extent.

This invention addresses these considerations and provides an improved structure with intermittent supports that constrains the end turns to acceptable levels of motion under operating conditions and at the same time provides channels for the flow of liquid helium with substantial direct contact of coolant to adequately cool the superconductor.

The present invention employs end region support blocks of L-shaped cross section such as are disclosed in the above-mentioned Ying et al. patent and in addition utilizes sets of spacers that are both mechanically strong and electrically insulating on the inward and outward and under surfaces of the coil in a manner that permits coolant circulation in direct contact with the winding. It also provides for supporting the end turn in a position tilted toward the pole while utilizing only readily machined elements. The spacers comprise a rear set that extends radially behind the coil and a front set that extends radially in front of the coil. (By the rear or inward side of a coil is meant the side facing the pole and the front or outward side of a coil means the side facing away from the pole.) At the bottom of the coil are a set of bottom spacers that may be integrally formed with, for example, the rear spacers to provide L-shaped elements to which the front side spacers are keyed. In a preferred form, the front and rear spacers are tapered. The rear spacers are tapered from a thicker dimension at the bottom of the coil to a thinner dimension at the top of the coil. Conversely, the front spacers are tapered from a thicker dimension at the top of the coil to a thinner dimension at the bottom of the coil. Thus the front and rear spacers confine the conductive stack so that it is tilted inward toward the pole, such as by about 5° to 10°, for more sufficient mechanical constraint and greater stability. There is a corresponding angle to the top surfaces of the bottom spacer and to the bottom surface of the top spacer.

Additional elements of the invention, provided in preferred forms, are sheets of side insulation to the front and rear of the coil between the front and rear spacers and the adjacent radially extending leg of the end turn support block to the front and rear of the particular coil. The side insulation is particularly beneficial, even though the spacers insulate the stack, because at the end of the spacers the taper to the smaller dimension is intentionally a very limited distance, such as about 0.1 inch (about 2.5 mm) that in some cases is not enough of a stand off distance to prevent current from arcing to the end region support block from the coil.

Other significant aspects of the invention concern the insulating support on the top side of each end turn. In accordance with this invention, a top insulating spacer is provided over each of the conductive stacks with means such as banding for compressively holding the top spacer against the coil and the coil against the bottom spacers and the radially inward, axially extending leg of the support block.

The top spacer has coolant flow passages in its inward and outward surfaces and its radially inward surface and is disposed with its top surface substantially flush with the top surface of the end region support blocks that are adjacent it on each side so that an end turn spacer cylinder that is attached to the support blocks fits closely around all the elements.

BRIEF DESCRIPTION OF THE DRAWINGS

FIG. 3 is a partial perspective view of an end turn support system in accordance with an embodiment of the present invention;

FIGS. 4 and 5 are partial perspective views of certain of the elements of FIG. 3;

FIGS. 6A and 6B are views of, respectively, a compression tool in use for assembling an end winding support system in accordance with this invention and the tool itself; and, FIG. 7 is a partial plan view of part of an end winding support system in accordance with this invention.

DESCRIPTION OF THE PREFERRED EMBODIMENTS

Figure 1:
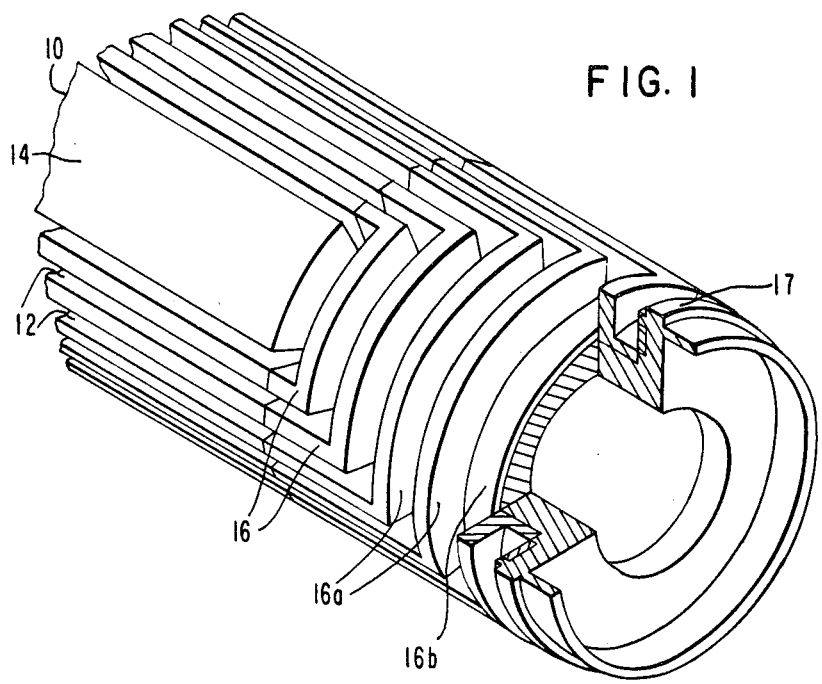
FIG. 1 is a partial perspective view of a rotor forging and end region support blocks as may comprise part of an embodiment of the present invention.

FIG. 1 shows a rotor forging 10 comprising a generally cylindrical member whose major portion has coil slots 12 configured about pole heads 14, of which one is shown. A plurality of end region support blocks 16 each have an overall U-shaped configuration disposed in an arc. Each of the support blocks 16 has a radially extending portion 16a and an axially extending portion 16b. The radial portions 16a of adjacent blocks 16 form a channel that completes a coil end turn location between two slots 12. The axial portions 16b of the blocks 16 are joined to the end region of the forging 10. The set of nested support blocks 16 in effect constitute extensions of the teeth of the rotor for support of a superconducting winding in the end turn region, with a similar arrangement at the other end of the rotor. The support blocks 16 are made of the same high strength material as is the rotor forging, such as an iron-nickel alloy.

An additional support flange 17 on the forging 10 completes the configuration of a set of U-shaped coil slots and end region support channels.

Figure 2:
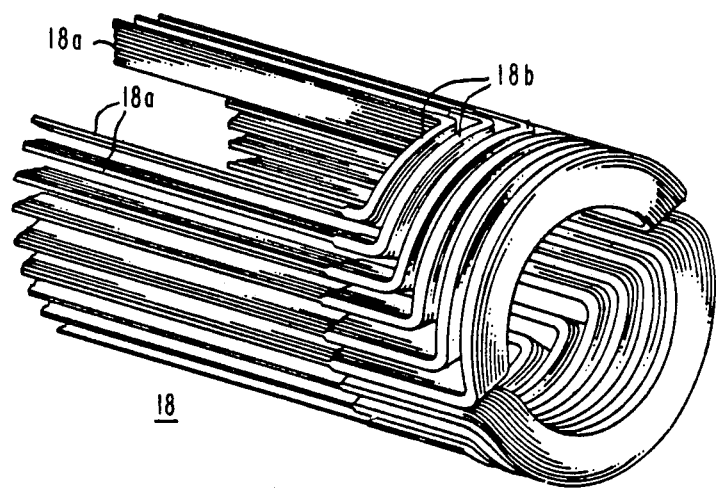
FIG. 2 is a partial perspective view of a rotor winding for location in a structure such as that of FIG. 1.

Referring to FIG. 2, there is shown a general configuration of a rotor winding 18 for fitting within the rotor structure of FIG. 1. This shows the slot portions 18a of the coils and their end turn portions 18b in the overall configuration of a two pole winding.

FIG. 3 shows the elements of the support structure and cooling arrangement within an end support block channel. In this view, one support block 16 is shown that provides the inward support for the coil end turn 18b. The outer support block is not shown for purposes of this illustration and it will be understood that some of the elements are shown broken away or in partial assembly for facilitating the illustration. As shown in FIG. 3, there is a sheet 20 of end turn side insulation adjacent the support block 16 to the rear of the coil and a sheet 22 of front side insulation to the front of the coil. There is then a set of radially extending rear spacers 24, spaced from each other between the rear side insulation 20 and the coil end turn 18b. There is also a set of front spacers 26 spaced from each other between the front side of the coil 18b and the side insulation 22. In addition, there is a set of bottom spacers 28 spaced from each other between the coil 18b and the surface of the axially extending portion 16b of the support block 16.

The end turn side insulation 20 and 22 insulates the superconducting coil 18b from ground, that is, the end region support blocks 16 to the front and rear of it. Even though the coil 18b has insulating spacers 24 and 26 between it and each of the support blocks, such as of an epoxy resin-glass fiber composite, insulation requirements such as creep distance cannot always be satisfied by the spacers 24 and 26 alone. As shown in this embodiment, the rear and front spacers 24 and 26 taper off to thin ends 24a and 26a which may be of the order of only about 0.1 inch (about 2.5 mm.) in some cases which is not enough of a stand off distance to prevent current from the superconduting coil 18b from arcing over to the end region support block 16. Therefore, an insulating sheet, such as also made out of an epoxy resin-glass fiber composite, is utilized as the end turn side insulation 24 and 26.

The end turn side insulation 24 and 26 is somewhat similar to a slot cell as may be used in the rotor body in terms of its function of insulating the coil from ground. However, here it is used only on the front and rear sides of the coil 18b but not underneath the coil. It would be most difficult to provide a molded continuous U-shaped piece of the side insulation to match the complex geometry in the end turns 18b. The bottom spacers 28 are sufficient in size to insulate the underneath side of the coil from ground.

In addition to an epoxy-glass composite material for the spacer elements, they, or some of them such as front spacers 26, may be of insulated metal to allow less compression and a more secure arrangement with less chance of gaps forming between the spacers and the coil.

In one preferred form of the invention, the front spacers 26 are of insulated metal and the L spacers of elements 24 and 28 are of epoxy-glass composite. The latter material is totally insulating, and its use does not require additional insulation between the bottom spacers 28 and block 16. The forces to be resisted tend to be outward toward the front, so there is benefit in having less compressive front spacers 26. Insulated metal elements used as spacers 26 may be variously formed. One example is to use a strong metal such as an iron-nickel alloy (e.g. Invar) to which insulation is applied by electrophoretic coating. The insulation need not be very thick, as the spacers are also insulated from the front support block 16 by the side insulation 22.

FIG. 3 also shows an insulating top spacer 30, to be described more fully below, over the end turn 18b, and an end turn spacer cylinder 32 that covers the entire end turn region.

In this embodiment, each of the rear spacers 24 and bottom spacers 28 are united as shown in FIG. 4 to provide a plurality of essentially L-shaped elements, joined together at their corners. The radial ends 24a of the rear spacers 24 are tapered to allow the superconducting winding to be wound tilted back toward the pole face 14. This provides a more stable configuration for a superconducting winding. Here, the taper is provided by the spacers themselves rather than the rotor body forging material. The epoxy-glass composition of the spacers 24 and 26 is much easier to machine than the high strength nickel alloy material of the support blocks 16. The L-spacer of pieces 24 and 28 supports the coil when winding and also transmits the electromechanical loads in operation through the winding to the next end region support block.

The gaps between the spacers 24, 26 and 28 provide abundant access for helium to flow in and cool the superconducting winding by direct contact. Semicircular grooves 28a are cut into, at least, the underside of each bottom support 28 to provide a free circumferential path for the coolant at the bottom of the coil. Radial holes through the support blocks 16 (FIG. 7) allow helium communication with the storage volume in the rotor bore.

The L-spacers of elements 24 and 28 can be made from a single piece of material such that a plurality of the support pieces 24 and 28 are formed together with tie bars 29 making one assemblable element individual as shown in FIG. 4. Due to the complex geometry around the corners of the support blocks 16, separate L spacers of elements 24 and 28, without tie bars 29, are preferably used in that location. Having a one piece assembly, or relatively few pieces, greatly simplifies the installation procedures and provides a more stable configuration to wind onto. It also prevents migration of any of the spacers. Migration of any of the spacers could result in the blockage of helium flow channels, which would cause a local hot spot in the winding.

In assembly, the spacers 24 and 28 are located in the channels provided by the rear support block 16, which has side insulation 20, prior to the winding of the coil therein. After winding, a front support block 16 with side insulation 22 cemented to it is placed in its position on the shaft and then the front spacers 26 are put into place.

The front end turn spacers 26 have a keyed fit at their thin end 26a with the end of the bottom spacer 28, in this example. They are directly opposite the radial legs of the spacers 24 so that the electromagnetic loads can be transmitted through the coil. The intermittent spacing of the side spacers 24 and 26 prevents the coils from undergoing large displacements due to these loads and at the same time allows the coolant to be stored between the spacers to cool the field winding should it undergo a resistive transition and generate heat. The spacers 24 and 26, as shown in FIG. 3, are also held in place at the top of the coil 18b by being inserted into notches in the end turn top spacer 30. This keying and interlocking arrangement insures that no migration of these pieces will occur.

The end turn top spacers 30, shown in FIG. 5, also made out of a strong composite material, provide needed creep distance from the coil 18b to the end turn spacer cylinder 32, that is at ground potential. It acts as a spacer or filler piece between the top of the coil and the end turn spacer cylinder. Spacer 30 has numerous circumferential and transverse grooves 30a, to allow helium to circulate from the side reservoirs between the side spacers 24 and 26 to the radial flow channels (not shown) within the superconducting field winding itself. A groove 30b is machined in the top of the end turn top spacer 30 to provide a space for banding to be applied to the coil. The end turn top spacers 30 support the coil against forces due to centrifugal and electromagnetic effects. Notches 31 are provided to interlock the end turn top spacer 30 with the side spacers 24 and 26.

In the body portion of the rotor, the coil can be held tightly in the slots by the use of wedges. In the end turns region, conventional rotors use a shrunk-on retaining ring to compress the winding. This technique is not applicable in the end turn region of a superconducting rotor because the retaining ring would only shrink down on top of the high strength end region support blocks 16, and the winding would not be compressed. The compression of the coils must be carefully controlled because the winding has only a certain allotted space. A conventional end winding can be elastically and plastically displaced radially inward towards the center of the machine. The end winding of a superconducting rotor, however, is supported underneath and on both sides, so the compression must be carefully controlled.

For this purpose an arrangement such as shown in FIGS. 6A and 6B is used. A specially devised tool 34 comprising two clamp rings 34a and 34b with compressing pads 36 can be mounted onto the end region support blocks 16 for compressing a coil within the coil space by utilizing hydraulic compression. The amount of compression is determined by the thickness of the end turn top spacer 30 and should provide for that dimension. With the coil thus compressed, a banding 38 such as a stainless steel strand-epoxy resin impregnated banding will be wrapped around the rotor in the groove provided in the end turn top spacer in a configuration such as is shown in FIG. 7. The top spacers 30 have appropriately machined grooves for location of the banding 38. The banding is then allowed to cure with the tool 34 in place and the pads 36 providing compression. Then the clamp rings of the tool 34 are removed. The coil is thus compressed by the cured banding 38.

The spacer cylinder 32 is then fit over the end turns and doweled into place into the end region support blocks 16. FIG. 7 shows the dowel holes 16c in the blocks 16. A retaining cylinder (not shown) traversing the entire length of the rotor is then shrunk over the field winding spacer cylinder 32.

The end turn winding support structure described herein supports the end windings of a superconducting generator rotor in a manner that provides required mechanical support, as well as cooling. This support structure minimizes movement of the superconductors that could cause frictional heating. It also allows coolant to have substantial contact with the superconductor surface and to circulate. The support structure is made of an insulating material since it is the only material between the bare surface of the superconductor and ground. The support structure is also manufactured in such a way as to ease assembly. As opposed to the structural arrangement of the above-mentioned Ying et al. patent, the present invention takes into account and provides for thorough cooling of the superconducting coil in a manner that was not provided therein and, in addition, provides for a more practical mechanical assembly of the elements of the end turn support.

It is apparent that from the embodiments shown and described herein further modifications may be made consistent with the purposes of the invention to achieve the adequate support of the end turns while permitting adequate cooling thereof.

What we claim is:

1. A dynamoelectric machine rotor, comprising:
   a superconducting field winding comprising a straight portion and an end turn portion, said straight portion being disposed in axial slots in a rotor body, said end turn portion extending axially from said slots;
   said end turn portion comprising a plurality of coils, each of said coils comprising a plurality of conductor stacks, each of said stacks comprising a plurality of conductors;
   an assembly for mechanically supporting, electrically insulating, and cooling said end turn portion including a plurality of end region support blocks, each of said support blocks having a generally L-shaped cross-section comprising an axial and a radial leg, one of said conductor stacks being disposed radially outward of said axially extending leg and in front of said radially extending leg of each of said support blocks;
   a plurality of insulative spacers including a set of radially extending rear spacers between each of said plurality of conductor stacks and said radial leg of one of said support blocks, a set of radially extending front spacers between each of said plurality of conductive stacks and said radial leg of another one of said support blocks, and a set of bottom spacers between each of said plurality of conductive stacks and said axial leg of one of said support blocks, said spacers serving to support said conductive stack and to insulatively space it from said support blocks, said spacers of each of said sets being spaced from each other to allow coolant to flow over a major portion of the surface of each of said conductive stacks; and,
   a top insulative spacer over each of said conductive stacks with means for compressively holding said top spacer against said conductive stack and said conductive stack against said bottom spacers and said axial leg of one of said support blocks, said top spacer having coolant flow passages on its axial inward and outward surfaces and on its radial inward surface.

2. A dynamoelectric machine rotor in accordance with claim 1 wherein:
   said set of radially extending rear spacers are each tapered and said set of radially extending front spacers are each tapered oppositely to said set of rear spacers so that said conductive stack is disposed in a tilted position with a top portion axially inward from a bottom portion thereof.

3. A dynamoelectric machine rotor in accordance with claim 2 further comprising:
   a sheet of rear side insulation between each of said sets of rear spacers and the rear adjacent one of said radial legs of one of said support blocks, and a sheet of front side insulation between each of said sets of front spacers and the front adjacent one of said radial legs of another of said support blocks.

* * * * *